July 18, 1950     E. H. PIRON     2,516,072
MOTION DAMPING DEVICE
Filed March 1, 1944     3 Sheets-Sheet 1

Inventor
EMIL H. PIRON,

By J. Hudson Davis
Attorney

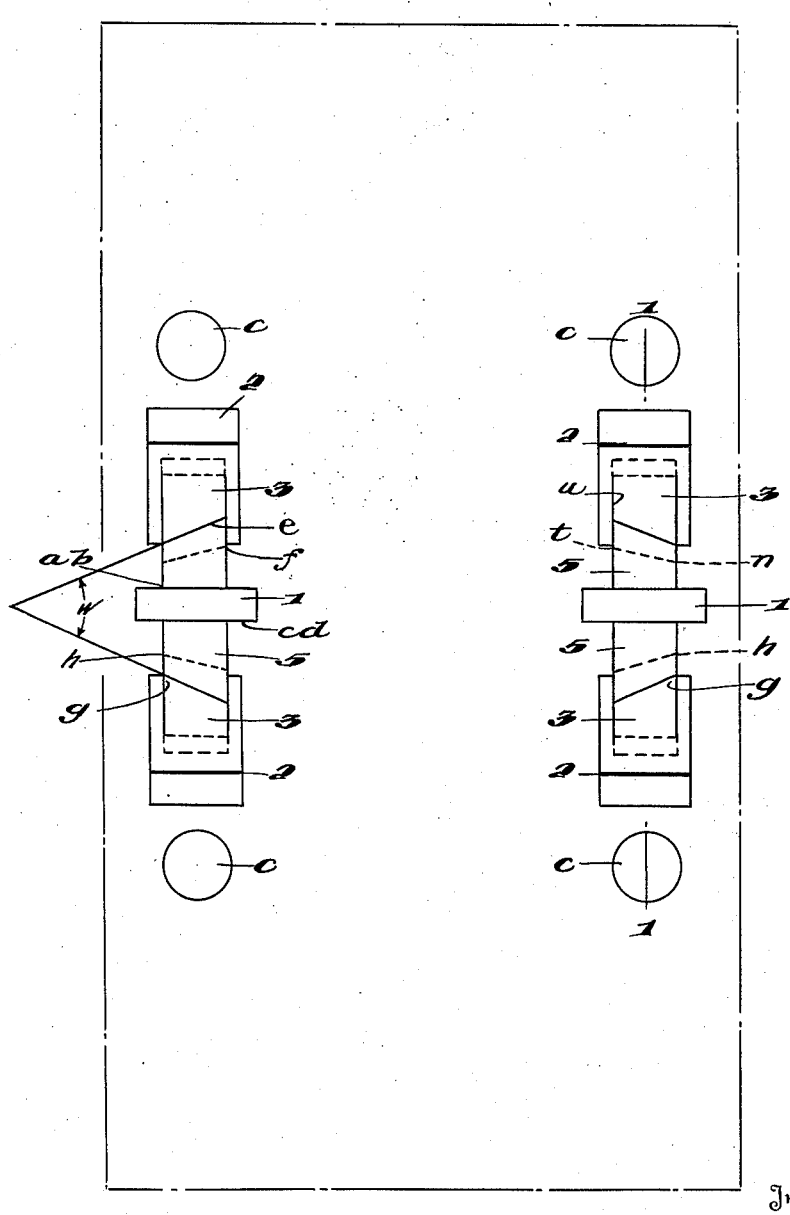

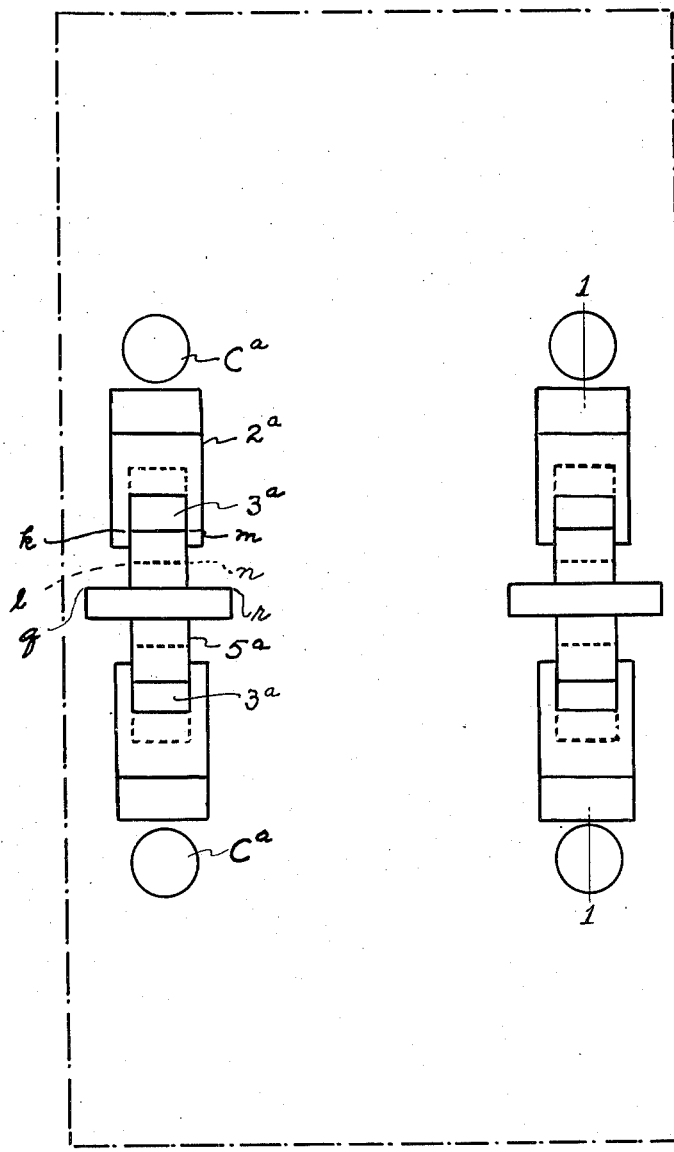

Patented July 18, 1950

2,516,072

UNITED STATES PATENT OFFICE 2,516,072

MOTION DAMPING DEVICE

Emil H. Piron, New York, N. Y., assignor to Transit Research Corporation, New York, N. Y., a corporation of New York Application March 1, 1944, Serial No. 524,649

9 Claims. (Cl. 267—9)

The invention relates to motion damping device and has for its object to provide a device which will absorb the kinetic energy of oscillating masses mounted on springs and to dissipate it into heat by means of frictional action.

A principal object is to provide a motion damping device which will damp all oscillations in any direction in one plane and to limit the amplitude of oscillations which may occur in directions diverging from that plane.

Another object is to provide a device of this type which will function for long periods of time without adjustment and which, after substantial wear may be adjusted easily and economically.

A further object is to provide a device which lends itself easily to alterations in the proportions of its parts so as to obtain any predetermined value of frictional forces throughout the range of its movement.

Another object is to provide a motion damping device which can be made entirely of solid materials and which lends itself to incorporation of certain parts, as for instance the frictional surfaces, which may suitably be made of a variety of materials other than liquids, as will hereinafter be described, to obtain additional qualities for special uses. For instance, one or both members of opposing frictional surfaces may be made of rubber or wood in order to damp the propagation through the damper of vibrations of high frequency and small amplitude.

A further object is to provide a motion damping device which lends itself to incorporation within the main springs which support a car body from a rail truck and which will dampen both vertical and lateral oscillations therebetween while serving as a driving connection in the intended direction of travel of the vehicle.

Figure 1:
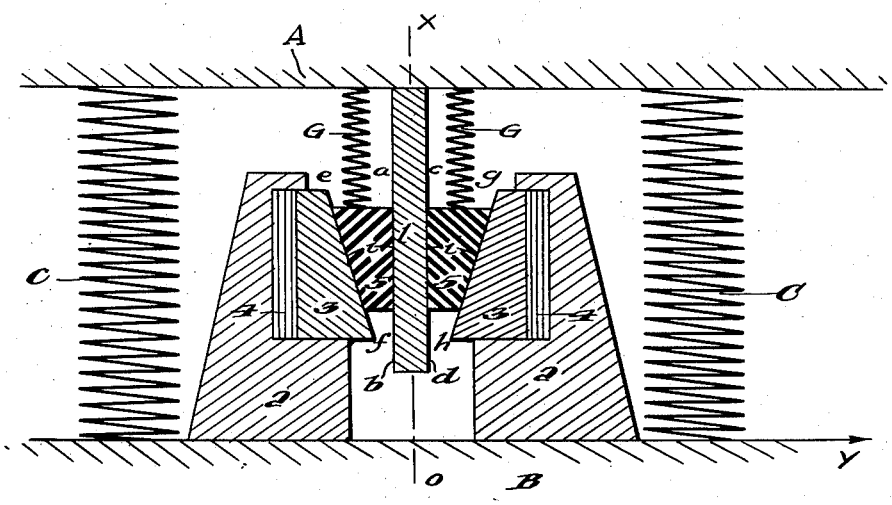

Other objects and advantages will become hereinafter more fully apparent as reference is had to the accompanying drawings in which my invention is illustrated and in which Figure 1 is a longitudinal vertical section taken centrally through my improved damping device and is identical when taken along the line 1—1 of Figure 3 of the preferred form and along line 1—1 of Figure 4 showing a modified form of the invention.

Figure 2:
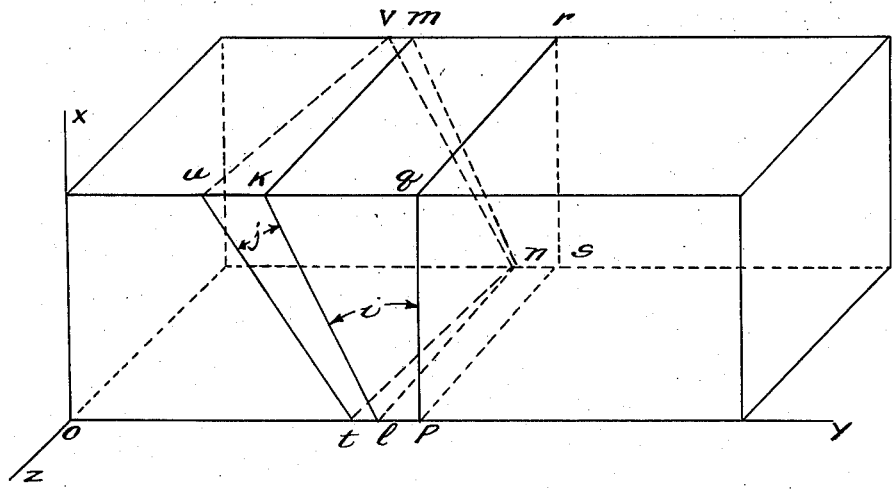

Figure 2 is a diagrammatic view showing the angularity of the friction surfaces of Figures 1 and 3, Figure 3 is a top plan view of the device of Figure 1 showing a particular arrangement of the frictional surfaces thereof, and Figure 4 is a view similar to Figure 3 showing a modified form of the invention.

More particularly, $l$ designates a plate fixed to and depending from a mass A, which may be the body of a vehicle, for instance. This plate has two faces $ab$ and $cd$ parallel to a vertical or $xoz$ plane at right angles to the direction of travel $oy$ of the vehicle. Two brackets 2, 2 are fixedly secured to the support B, which may be the axle frame of a rail vehicle truck which supports the body A by means of main springs C, C. These two brackets are equally spaced fore and aft of the plate $l$ and are each provided with a recess to receive blocks 3. These blocks have inclined surfaces $ef$ and $gh$ which converge downwardly toward the plate $l$. Shims 4 space the blocks 3 from the rear of the recesses in the brackets 2 and may be increased in number or in thickness to compensate for wear of the frictional surfaces of the device.

Between the faces $cd$ and $gh$ and between the faces $ab$ and $ef$ are wedges 5 which are not bound or fixed but which rest in the angle $i$ formed by the faces. These blocks 5 may be free or, preferably, forced into their angle by means of springs G which abut the mass A fore and aft of the plate $l$.

In operation, when the mass or body A moves toward the base or truck frame B, the friction of the plate $l$ against the wedges 5, 5 forces these wedges into the angle $i$ and increases the pressure between the wedges 5 and the plate $l$ thereby increasing the friction. When the mass or body A moves away from the base or frame B, friction between the same faces pulls the wedges 5 outwardly of the angle $i$ thereby relieving the pressure and their friction against the plate $l$. Thus frictional action is provided which dampens the motions of oscillation of the mass A with respect to the base B parallel to the $ox$-axis in such manner that in one direction of motion the frictional force is great and in the other it is small.

At the same time, the friction of the wedges 5 against the plate $l$ serves to damp oscillations in a direction $oz$ transversely of the direction of travel of the vehicle and consequently at right angles with the plane of the figure. The amount of damping in the plane $oz$, which represents the direction transversely of the direction of vehicle travel, is dependent upon the angular position of the surfaces $ef$ and $gh$ with respect to the $oz$ axis. Figure 4 illustrates these surfaces parallel with this axis in which case the angle $i$ is the same at any vertical cross section. This is illustrated in Figure 2 in which the plane $klmn$ is illustrated in a position parallel with the $oz$ axis, normal to the $oy$ axis and forming the angle $i$ with a plane $pqrs$ parallel to the $ox$ axis, the plane $pqrs$ being in a position to contain the surface $ab$ and the plane $klmn$ being in a position to contain the surface $ef$. In this case there will be a certain amount of damping in an $oz$ direction of movement of the mass A since the surfaces $ab$ and $cd$ have frictional contact with the adjacent faces of the wedges 5a but there will be no increase of resistance to such motion and the resistance will be the same in either direction parallel to the $oz$ axis. In Figure 4 the surfaces corresponding to the surfaces $ef$ and $ab$ are indicated by the designations of their planes as explained in Figure 2 and the remaining reference characters are the same as those of Figures 1 and 3, but with the characters being primed with the small letter $a$.

The preferred form of my invention involves the use of surfaces $ef$ and $gh$ which form an angle with both the $oy$ and $oz$ axes. Again referring to Figure 2, if the position of the plane $klmn$ is altered so that the point $n$ remains constant while the point of intersection $l$ with the $oy$ axis is moved to a point $t$ closer to the origin $o$ then the line $nt$ is no longer normal to the $oy$ axis. If the point $m$ is moved to a new position $v$ and the point $k$ is moved to a new position $u$ so that the distance $uk$ is greater than the distance $vm$ then the angle $j$ between the surfaces $klmn$ and $tuvn$ changes with each vertical section parallel to the section of Figure 1 and a top plan view of the resultant arrangement of two damping devices, as would be used in a vehicle, is illustrated in Figure 3. In this event, Figure 1 may be a vertical section taken along the line 1—1 of Figure 3 with the spring C, the mass A and the support B added. The position $tuvn$ of the surface $ef$ is indicated in Figure 3. For purposes of clarity a duplication of the showing of the plane containing the surface $gh$ has been omitted from Figure 2 but is believed clearly shown in Figure 3 in which it is seen that this surface and the surface $ef$ lie in planes which converge outwardly of the vehicle forming an angle W. The corresponding angle on the shock absorber at the opposite side of the truck is reversed, as illustrated in Figure 3, so that lateral damping is the same in both directions. There would be no difference in operation if the planes converged in a direction inwardly of the vehicle provided the arrangement of surfaces on the other side of the vehicle is also reversed. The combination of the friction in the direction $ox$ with that in the direction $oz$ serves to damp any oscillations of whatever direction, in the plane $xoz$.

The value of the frictional forces depends on the force of the action of the springs 6, on the value of the angles $i$ and $w$, on the value of the coefficient of friction of the wedges 5 with the plate 1, and on the value of the coefficient of friction of the wedges 5 with the blocks 3. These elements, i. e. the loading of the springs 6, the angles $i$ and $w$ and the material combination between the parts 1, 3 and 5 upon which the coefficient of friction depends can be chosen so as to meet almost any damping problem.

In addition, if it is desired to introduce some elasticity into the damping effect, for instance for the purpose of stopping the propagation through the damping device of vibrations of high frequency and small amplitude the wedges 5 or the wedges 3, or both, may be made of elastic material such as natural or synthetic rubber of the proper hardness. In general, natural or synthetic rubber is a convenient material especially for the wedges 5, because it has a high coefficient of friction against the faces of most other suitable materials. The plate 1 is suitably made of steel and the wedges 3, which are stressed only in compression, can be made of any solid material including metal and wood.

When the coefficients of friction are chosen so as to permit the use of an angle $i$ of sufficiently small value, the wedges 5 can not be displaced by forces in the $oy$-axis or direction of travel. In that case the damper serves also to restrain motions or oscillations and to transmit accelerating or decelerating forces in the direction of travel.

This damper does not require close adjustment since the wedges 5 automatically take their proper position in the angles $i$ and $w$. When the parts wear and the wedges drop too far down into the angle $i$ additional shims 4 may be added, as indicated above.

Various modifications may be made by one skilled in the art and I desire to be extended protection within the scope of the appended claims.

What I claim is:

1. The combination of two main members resiliently spaced and relatively movable vertically and laterally and a motion damping device between said members, said device comprising, load imposing and load receiving members having angularly disposed frictional surfaces, the load imposing member residing between said load receiving members and having its working surfaces parallel, rubber wedge shaped means separating the working surfaces of said load imposing member from those of said load receiving members and in frictional contact therewith, spring means urging said wedge means in pressure contact with said surfaces, said wedge means increasing its pressure against said surfaces by virtue of friction and the pressure of said spring means when said members are moved relatively in one vertical direction and decreasing the pressure against said surfaces by virtue of friction when said members are moved relatively in opposite direction, said spring means imposing a substantially constant pressure on said wedge means during relative lateral movements of said load imposing and load receiving members.

2. In a motion damping device, spaced load receiving members having friction surfaces convergent vertically and laterally, a load imposing member bisecting the angle between said surfaces and having parallel friction surfaces on opposite sides thereof in spaced relation with the first named surfaces, wedge means between said load imposing member and each of said load receiving members having surfaces in frictional engagement with the frictional surfaces thereof, and spring means urging said wedge means into the angle formed by said members, said wedge means upon movement of said load imposing member into the angle and also in one direction across the angle formed by said load receiving members increasing their pressure against said load imposing and load receiving members and upon movement outwardly of said angle and across the angle in the opposite direction decreasing their pressure against said load imposing and load receiving members.

3. In a motion damping device, vertically arranged load receiving members having spaced vertically and horizontally convergent friction surfaces, a vertically arranged load imposing member bisecting the vertical and horizontal angle between said load receiving members and having parallel friction surfaces on opposite sides thereof in spaced relation with the first named surfaces, and wedge means between said load imposing member and each of the load receiving members having surfaces in frictional engagement with the surfaces thereof, said wedge means resting in their respective angles under the influence of gravity and increasing their pressure against said members upon relative horizontal movement of said members in one direction and decreasing their pressures therewith upon movement in opposite directions.

4. The combination of a mass resiliently supported from and movable with respect to a base and a motion damping means comprising spaced load receiving brackets mounted on said base, friction blocks mounted in said brackets each having inclined downwardly and laterally converging friction surfaces, a load imposing plate depending from said mass extending between said friction blocks, and wedges between each side of said plate and said blocks, said wedges increasing their pressure against said blocks and said plate during movement of said plate across the angle formed by the inclined faces of said blocks and decreasing their pressure therewith upon movement of said plate in the opposite direction.

5. In a motion damping device, load imposing and load receiving members having angularly disposed frictional surfaces and wedge shaped means separating said surfaces and in frictional contact therewith, said wedge shaped means sliding on at least one of said surfaces while increasing its pressure against both of said surfaces during relative movement of said members in one direction and sliding on at least one of said surfaces while decreasing its pressure against both of said surfaces during relative movement of said members in opposite direction, said wedge means being composed of rubber.

6. In a motion damping device, load imposing and load receiving members having angularly disposed frictional surfaces and wedge shaped means separating said surfaces and in frictional contact therewith, said wedge shaped means sliding on at least one of said surfaces while increasing its pressure against both of said surfaces during relative movement of said members in one direction and sliding on at least one of said surfaces while decreasing its pressure against both of said surfaces during relative movement of said members in opposite direction, the frictional surfaces of said load imposing and load receiving members being metallic, said wedges being made of an elastic rubber-like material.

7. The combination of a mass resiliently supported from and movable with respect to a base and a motion damping means comprising spaced load receiving brackets mounted on said base, friction blocks mounted in said brackets each having inclined downwardly converging friction surfaces, a load imposing plate depending from said mass extending between said friction blocks, wedges between each side of said plate and said blocks, and spring means acting on said wedges in a direction parallel to the friction surfaces of said load imposing plate, said wedges increasing their pressure against said blocks and said plate during movement of said plate into the angle formed by the inclined surfaces of said blocks and decreasing their pressure therewith upon movement of said plate in opposite direction, said wedges being made of an elastic rubber-like material.

8. The combination of a supporting means, a mass resiliently supported on said means and capable of vertical and lateral movements with respect thereto, and a shock absorber between said mass and said supporting means, said shock absorber comprising spaced opposed face members having convergent friction surfaces secured to said supporting means, a plate having substantially parallel surfaces depending from said mass and extending between said members, wedges of elastic, rubber-like material between said friction surfaces and the surfaces of said plate, comparatively light springs urging said wedges into the angle formed by said friction surfaces, said plate when in downward vertical movement urging said wedges into increasing pressure contact therewith by virtue of friction thereby increasing resistance to downward movement of said mass, said plate when in lateral movement relative to said supporting means having frictional contact with said wedges, said springs acting on said wedges both during relative vertical and lateral movements of said mass and said supporting means.

9. The combination of a supporting member, a supported member resiliently separated therefrom and capable of relative vertical and lateral movements with respect thereto, and shock absorber means comprising two laterally spaced shock absorbers connecting said members, said shock absorbers each comprising spaced opposed base members having downwardly and laterally convergent friction surfaces supported by said supporting member, a plate member having substantially parallel friction surfaces secured to and depending from said supported member and extending between said convergent surfaces and wedges between each of said base members and said plate member, the laterally, convergent surfaces of one of said shock absorbers converging in one direction and the laterally convergent surfaces of the other of said shock absorbers converging in opposite direction, and springs urging said wedges into downward pressure contact with said convergent surfaces and said parallel surfaces.

EMIL H. PIRON.

REFERENCES CITED

The following references are of record in the file of this patent:

UNITED STATES PATENTS

| Number | Name | Date |
| --- | --- | --- |
| 1,637,149 | Haseltine | July 26, 1927 |
| 1,698,727 | Miner | Jan. 15, 1929 |
| 1,913,414 | Schmidt et al. | June 13, 1933 |
| 1,980,227 | Repony | Nov. 13, 1934 |
| 2,079,088 | Spence | May 4, 1937 |
| 2,217,818 | Ronning | Oct. 15, 1940 |
| 2,263,599 | Tucker | Nov. 25, 1941 |
| 2,277,263 | Tucker | Mar. 24, 1942 |
| 2,295,556 | Flesch | Sept. 15, 1942 |
| 2,378,414 | Light | June 19, 1945 |

FOREIGN PATENTS

| Number | Country | Date |
| --- | --- | --- |
| 378,410 | Great Britain | Aug. 4, 1932 |